United States Patent [19]

Britt

[11] 3,882,463

[45] May 6, 1975

[54] CHARACTER RECOGNITION APPARATUS

[75] Inventor: Ronald Howard Britt, Crawley, England

[73] Assignee: U.S. Philips Corporation, New York, N.Y.

[22] Filed: Mar. 18, 1974

[21] Appl. No.: 451,780

Related U.S. Application Data

[63] Continuation of Ser. No. 262,142, June 12, 1972, abandoned.

[30] Foreign Application Priority Data

June 14, 1971 United Kingdom.............. 27679/71

[52] U.S. Cl.............. 340/146.3 AC; 340/146.3 MA

[51] Int. Cl............................................. G06k 9/12

[58] Field of Search.......... 340/146.3 MA, 146.3 H, 340/146.3 AC, 146.3 J

[56] References Cited

UNITED STATES PATENTS

| | | | |
|---|---|---|---|
| 3,496,542 | 2/1970 | Rabinow | 340/146.3 MA |
| 3,560,930 | 2/1971 | Howard | 340/146.3 H |
| 3,613,080 | 10/1971 | Angeloni et al. | 340/146.3 MA |

*Primary Examiner*—Gareth D. Shaw
*Assistant Examiner*—Leo H. Boudreau
*Attorney, Agent, or Firm*—Frank R. Trifari

[57] ABSTRACT

Disclosed is a character recognition apparatus which comprises means for comparing a complete character with each member of a set of masks corresponding to a set of complete characters which may contain such complete character. Each mask of the set includes a further set of discrete mask elements arranged in certain positions. Means are included which are connected to the comparing means for linking predetermined mask elements of each mask element set into linked groups. Means connected to the linking means are employed for detecting a fit of these linked groups with a complete character by applying a certain criterion. Indicating means which are connected to the detector means for supplying a signal indicating a complete character fit with a mask are also included. A method for employing linked groups of mask elements for character recognition is also disclosed.

16 Claims, 9 Drawing Figures

CHARACTER RECOGNITION APPARATUS

This is a continuation, of application Ser. No. 262,142, filed June 12, 1972, now abandoned.

This invention relates to character recognition apparatus in which the character is known to be a member of a set of characters represented by a corresponding set of masks used in the recognition process.

Accordingly, the invention provides character recognition apparatus comprising a. means for comparing a character with each member of a set of masks corresponding to a set of characters which may contain such character, each mask comprising discrete mask elements set in predetermined relative positions corresponding to selected parts of the associated character, b. means for linking the mask elements into groups c. means for detecting a fit of each such linked group with a character by applying a fit criterion in which at least a predetermined fraction of the elements of the mask group fit the character, and d. means for indicating a fit of the character with the mask when a selection of the groups of mask elements thus fit such character.

The apparatus may be such that the selection of groups used to indicate a fit of the character with the mask comprises all of the groups, and such that the groups are all linked pairs of mask elements. A majority of the linked pairs of mask elements may be formed of adjacent pairs of mask elements.

Such adjacent pairs of mask elements may overlap and share a mask element, and the fit criterion may be such that a fit is declared if no two adjacent mask elements are misfits with respect to the character, even though single isolated mask elements may be misfits.

Such a criterion is advantageous in that it aims at discriminating between defects, such as bad quality printing or bad inking and the deliberate absence of a part or stroke of a character due to a wrong choice of mask.

The character recognition apparatus of the present invention may be presented with the character in substantially its original form, for example by optical projection of the printed character onto an array of photodetectors corresponding to the mask points. Alternatively, the character may have been digitized in which event the act of digitizing the character consists of two basic steps. First, a limited background area containing the character is divided into a set of a finite number of elements of area. For example, the background area may be reactangular and may be divided into regularly disposed rows and columns of elements of area, many other background area division patterns being possible. The division pattern extends across any character which may have been superimposed on the background. A point is chosen in each element of area, spatially related to the element, for example a centre or a corner. The set of these points corresponding to the set of elements, when taken with their positional coordinates, constitutes a representation of the background area, and will be referred to as the character matrix.

The contrast between the background and the character is the basis of the second step in digitization. The final result of this second step is to assign to each element point a number which has one of only two possible values. One value will be indicative of the background, the other value the character. For example, the numbers '0' and '1' may be assigned to the usually white background and usually black character areas respectively.

The ultimate object is that when each element value is associated with its position in the character matrix, a representation of the character is obtained which, were it used to recreate a visual character, has all shading of intensity removed and the essential geometrical outline of the character retained in unitary step or dot form. As far as possible, this outline is to correspond to that which would have been assigned to the character by an experienced human observer, or to that originally intended by the printer.

The contrast between character and background may arise physically in many ways, although they will be referred to as "blackness" and "whiteness." In some situations the character must be read by humans as well as by machines. In many cases this requirement is met by arranging the machine reader to be responsive to much the same spectral region as the human eye. However, many photoelectric devices respond at least as well in the near ultra-violet or near infra-red region as they do in the visible region, and many inks used for printing provide adequate contrast with the paper in these regions. For example, silicon photodetectors have good response in the near infra-red region, and consequently the illumination of the paper may be chosen to lie in this region. But magnetic ink is also very dark and provides excellent contrast for humans, while the corresponding machine reader uses magnetic pick-up devices and does not respond to electromagnetic radiation of any wavelength. In other situations, human readability may not be required and even an invisible "ink" may be desirable to avoid confusion with other human readable material or for other reasons. The "ink", in this case, may be a phosphor readable only by machine or human when illuminated with ultra-violet light to excite the phosphor to produce a readable character.

After digitization, therefore, the character exists in purely numerical form, being a list of the co-ordinate values of each character element and its associated binary value, and it can be handled and processed by computer methods which may be completely divorced from the original geometrical outline of the character. For example, the binary values of the elements of the matrix containing the character can be fed in a predetermined sequence into a shift register. The character is then available as a single binary 'word.' Such a shift register store provides the points which can be used as mask points, and presents the character to such mask points in a wide range of positions as the character is shifted through the store. Such a store tolerates the range of horizontal and vertical positions in which the character will be found on the paper. The functioning of a shift register store in these respects will be described in more detail hereinafter.

The selection of the positions for the mask elements hereinafter referred to as mask points, is a design parameter of the system. The selection can be made in various ways depending on the recognition logic being employed, and upon the font of characters to be recognized. The font may be one of a number of fonts specially designed to facilitate machine recognition, such as O.C.R. 'A,' O.C.R. 'B,' or E.13B, these being fonts especially well known in the art. In the example given, the selected points are placed in a single file along the centre-lines of the strokes of the standard versions of the characters of the font in use, in this case O.C.R. 'A.' With other fonts, such as E.13B, double files of mask points may be used in the specially thickened parts of character strokes employed in such fonts.

Another design parameter of the system is the pattern of linking between the selected mask points. A number of mask points may be linked together into a group as aforesaid, and a criterion applied to the points within the group to decide whether the group as a whole fits the corresponding part of the character. This linking apparatus may help to distinguish between small "white" areas in a "black" character which may be due to bad printing, and larger white areas which may be due to a genuine mismatch of the whole character. The linking may be effected in practice by the interconnections in the recognition logic circuits, as will be described in the following detailed description.

The variety in linking possibilities is considerable. The groups within a character need not each contain the same number of points. They can overlap to a variable extent with other groups. Linked points need not be adjacent, the linking being used, if desired, to indicate a simultaneous fit of a few specially chosen remote points. It will be generally true, that the number of linked points in any group will be much less than the total number of points in the whole mask. It will also be generally true, that a fit of the character as a whole will only be indicated if the criteria of fit of all the groups are met simultaneously. In the detailed description, the groups consist of adjacent overlapping pairs of points.

The selection of certain linked points may be made with a view toward reducing the range of positions in which the mask fits the character, so that the location of the character may be better defined. In the detailed description this is shown to assist with the timing of the recognition circuits in practice.

In addition to the mask elements selected to fit with character areas, other mask elements are selected to fit with background areas, such background mask elements are linked together into groups, and a fit criterion is applied to each group in which any simultaneously occurring fit of the character with the character mask elements will only be declared, if at least a predetermined fraction of the elements of each group are a fit with the background. Such background mask elements will be referred to as mask white points. They may be linked together into groups, which can be referred to as white groups covering background areas of the character matrix which should be devoid of black elements. In general, these white groups may exercise a vetoing influence on the recognition process, when the group contains black elements, even if the mask black points are a fit with the character. Such white groups will be particularly valuable in recognizing small characters, such as punctuation marks which, having so few black elements, would otherwise fit with parts of several characters. A white group used for this purpose need not cover all of the area of the character matrix not occupied by black elements. For example, one or more strategically placed white groups shaped as strips, each strip containing relatively few mask white points, may be sufficient to prevent mistaken identification with all other characters. The particular character font in use will determine the number, size, and mask white point density, of the white groups needed for each character.

The groups may consist of single mask white points, and the fit criterion may be such that if any one group is a misfit with the background, the character as a whole is declared to be a misfit regardless of any simultaneously occurring fit of the character with the character mask elements. With the normal alphanumeric characters, it will be sufficient to have a few isolated mask white points placed so as to improve discrimination between characters which are known to be similar. In such cases, any one mask white mask point registering with a black element in the character matrix, may prevent recognition even if the black mask points, as a whole, are a fit. Where extended area white groups are employed, this same strict rule may apply to any one mask white point in the group, but alternatively, linking inside the group may permit one or more isolated black elements to be present without a misfit being declared. Such a linking scheme, will allow occasional single black character elements to occur without inhibiting recognition, in the same way, as single white elements in a character stroke allow recognition according to the black mask criterion descriibed above, and in the detailed description.

An embodiment of the invention will now be described in more detail with reference to the accompanying drawings, and in which:

FIG. 1*a* shows a character and its associated mask.

FIG. 1*b* shows the linking of the character elements of FIG. 1.

Figure 1:
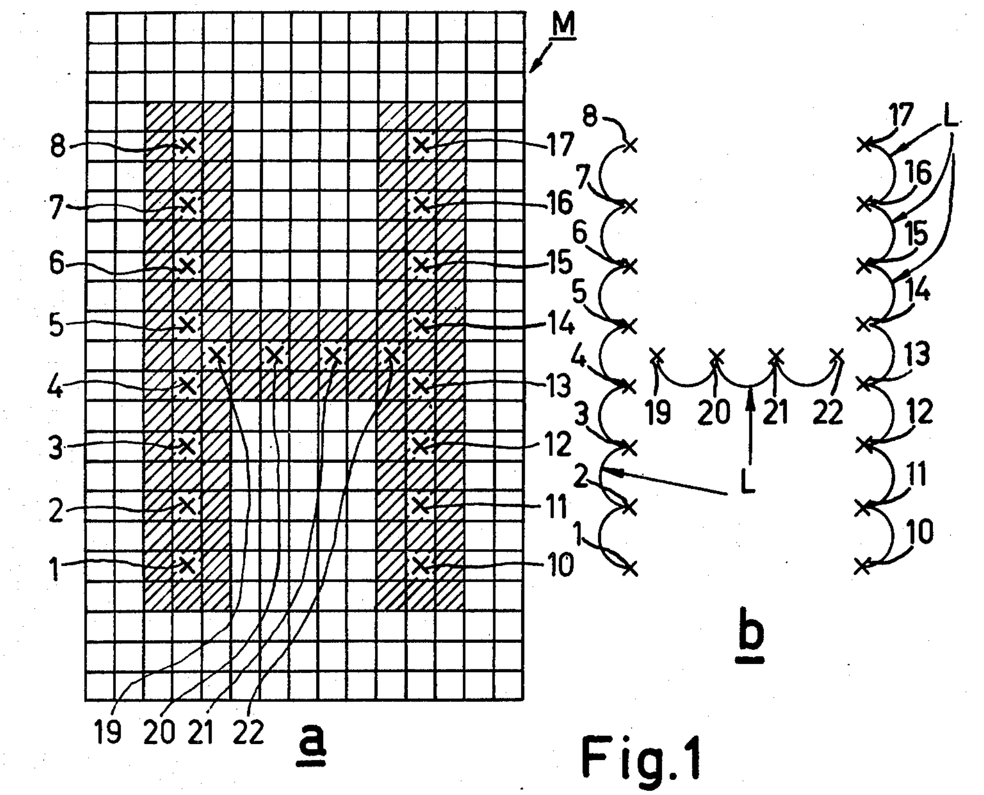

Assuming that the character has been digitized, the positions chosen for the mask points are centered on the elements of a matrix of rows and columns corresponding to that of the character, so that the mask elements or points, may register with the character matrix elements in any of the many positions in which the character can be presented to the mask, with part or all of the rows and columns of the two matrices in coincidence. FIG. 1*a* shows a typical mask to match the letter 'H' with the same mask shown aligned with a digitized version of the character (C) set in a character matrix (M). It should be noted that the mask points will, in general, be more widely spaced than the elements of the character. For example, the mask points may be placed in single file along the centre-lines of the strokes of the standard versions of the characters of the font in use, and may be placed on every alternate character element found along such a single file. In consequence of this, the number of mask points in a full character height stroke, for example the verticals of the 'H' of FIG. 1*a*, may be less than the number of character elements in the same height. Hence, the number of shift register stages, *m*, in one vertical column of the shift register store of FIG. 4, may be greater than the number of mask elements in the character height. In practice, the number of such stages $m$, and hence the number of elements in the vertical direction of the character of matrix, may be chosen sufficiently large to accommodate not only the full character height, but also the expected vertical range of positions in which the original character on paper will be presented to the scanner.

The mask points along the limbs of the character are linked together into groups. For example, in FIG. 1*b* the left hand vertical limb of the 'H' has eight points 1 to 8 linked together by links L, so as to form seven overlapping groups of two. Similarly, the right hand vertical limb has eight points 10 to 17 linked together to form seven more overlapping groups, and the horizontal limb has four points 19 to 22 linked so as to form three more overlapping groups. The function of the imaginary points 9 and 18 will become clear when the fit criterion is discussed below.

One criterion of fit which can be applied to these groups, is to allow any number of single mask points to be a misfit without declaring the character as a whole to be a misfit, provided no two adjacent linked mask points are misfits. By way of definition, a misfitting mask point is one which is in coincidence with a white or '0' value character element. Returning to the example of FIG. 1*b*, if both points of any one of the adjacent linked pairs on the left hand limb are misfits, the apparatus will treat the whole mask as a misfit. However point 19, although physically adjacent to points 4 and 5, is not linked to them, and so a misfit of the character would not be declared if the pairs of points 4 and 19, or 5 and 19, were misfits.

Figure 2:
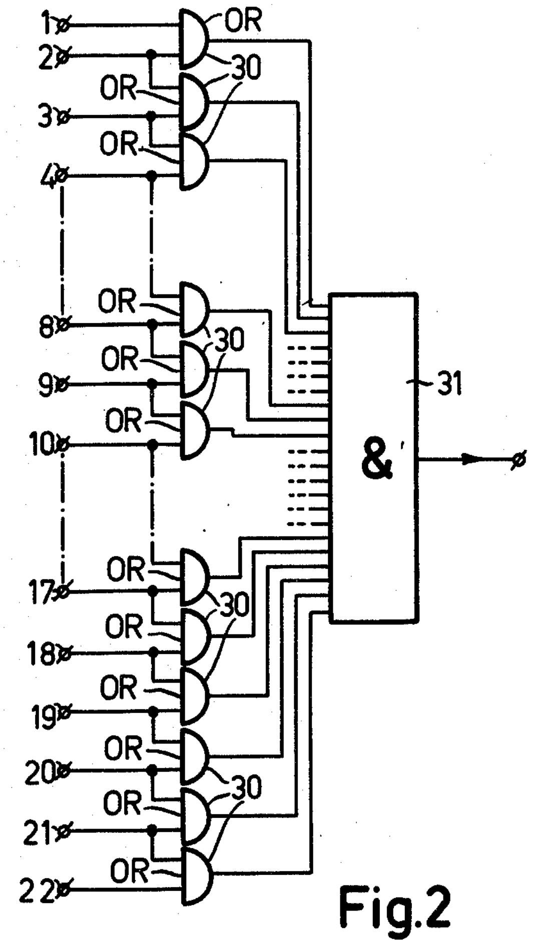
FIG. 2 shows a mask logic circuit.

FIG. 2 shows an example of mask logic adapted to implement this fit criterion. The mask points are connected to any array of two - input 'OR' gates 30. Each of the adjacent pairs of points, 1 and 2, 2 and 3, etc., is connected to the input of one gate 30 which thus acts, interalia, as one of the links L of figures. All the outputs of the gates 30 are connected to a multiple input 'AND' gate 31. When a mask point is a fit with the character, the character element has the value '1' or 'black.' The output of any one OR gate 30 will have the value 1, if either one or both inputs from the associated adjacent pair of points have the value 1. If all the gates 30 have a 1 output, the AND gate 31 will have a 1 output, and this will indicate a character fit with the mask. But if two adjacent linked mask points have the value 0, the output of their associated OR gate will have the value 0, and hence the output of the AND gate 31 will have the value 0, and a misfit will be indicated for the whole character.

The function of the imaginary points 9 and 18 can now be seen. In the example of FIG. 2 it is not desired, in this case, to associate the point at the end of one stroke with the point at the beginning of another stroke as a pair fed to one OR gate 30. The reason for linking adjacent pairs, is to determine when materially large parts of a mask do not fit a character, and not when small holes appear in a character due to bad printing. For example, the point at the bottom of the right hand limb should not be labelled 9 and connected adjacently with point 8 to one OR gate 30. A dummy input 9 is provided between these connections and is fed with the value 1 permanently. This effects the geometrical isolation of the first two strokes. Similarly, point 18 isolates strokes 2 and 3 in the example. Alternatively, the input to the AND gate 31 fed from the OR gate 30, fed by the inputs from the ends of two strokes, could be disconnected from that OR gate 30 and fed with a constant 1. The disadvantage of this method of avoiding linking the ends of strokes, is that the circuit of FIG. 2 could no longer be manufactured as an item identical for all masks which is then plugged into a set of connections differing for each mask, since the internal wiring of the circuit would now depend on the number and length of the strokes of the mask.

Figure 3:
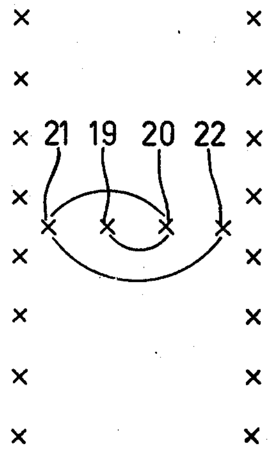
FIG. 3 shows an alternative linking scheme for mask black points.

Having described the example illustrated by FIGS. 1*a*, 1*b*, and 2, it should be appreciated that the linking of pairs of points can be based on other principles, or can even be quite arbitrary. In FIG. 3, for example, the H mask horizontal limb has its four points linked in the "spiral" order shown. This would be done, by connecting the points labelled 19 to 22 in FIG. 2, to the relabelled center limb points of FIG. 3. Such other forms of linking may confer advantages in discriminating between characters. For example, the simultaneous absence of character area at points 21 and 22 in FIG. 3, may indicate for example, that the character is not an 'H,' but two 'I's separated by a dash. The linking may also be chosen in relation to the known propensity of a particular printing mechanism for consistently printing some parts of a character more darkly than others, and for consistently leaving breaks in certain other parts. As a further example two points in a mask may be linked in such a way that the range of positions over which the character fits the mask may be reduced. This could be of benefit to the recognition system in those cases where such range of positions is large, and hence the relative position of the character with respect to adjacent characters is ill defined. In practical recognition systems, it is of importance to be able to determine the relative position of adjacent characters, so that the recognition system can be inhibited while the region of paper between two characters is being scanned. Otherwise, a spurious recognition may occur when the leading edge of one character, and the trailing edge of the other character, are applied to a suitable mask. This situation will be more likely to arise when the characters have been printed thickly. The letter 'F,' and its associated mask, may be taken as an example. A pair of linked points could be chosen having one point at the extreme right end of each of the two horizontal strokes. As the character center line moves out of registration with the mask, this pair of points will indicate a misfit sooner than a horizontally adjacent pair at the end of one of the strokes.

Figure 4:
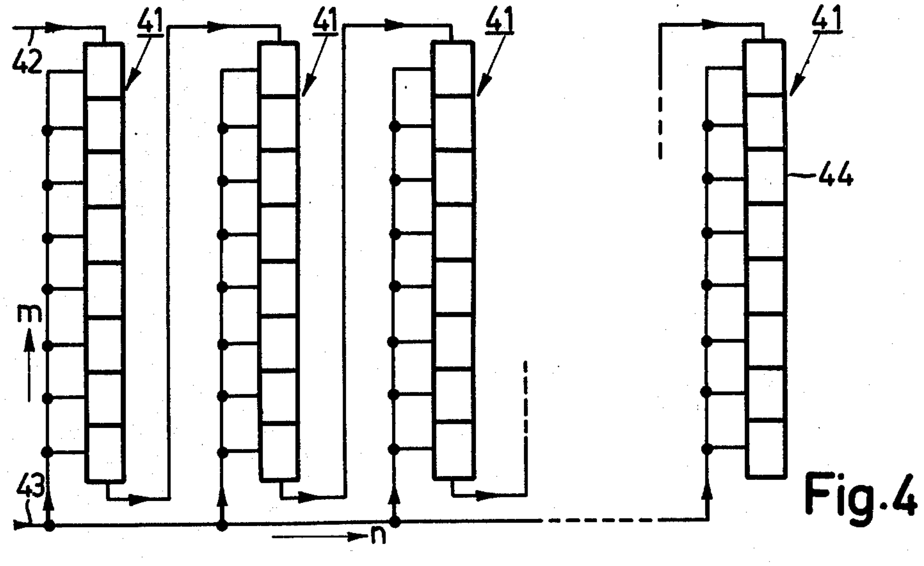
FIG. 4 is the shift register store laid out as a matrix.

It will be appreciated, that the mask of FIG. 1*a* connected to the mask logic of FIG. 2, could be applied to a character in a single test for fit. The mask and mask logic of each of the characters of the font could, in principle, be applied in sequence to the character until a fit had been achieved with one of them. This would be possible in applications where the position of the character is known accurately in advance. However, where this is not so, it has been indicated that a preferred method of applying the character to the mask, is to pass the digitized character through a shift register store to which the mask connections are made. FIG. 4 shows the shift register arranged as a matrix, and FIG. 5 shows the same shift register redrawn to show the mask connection points.

Figure 8:
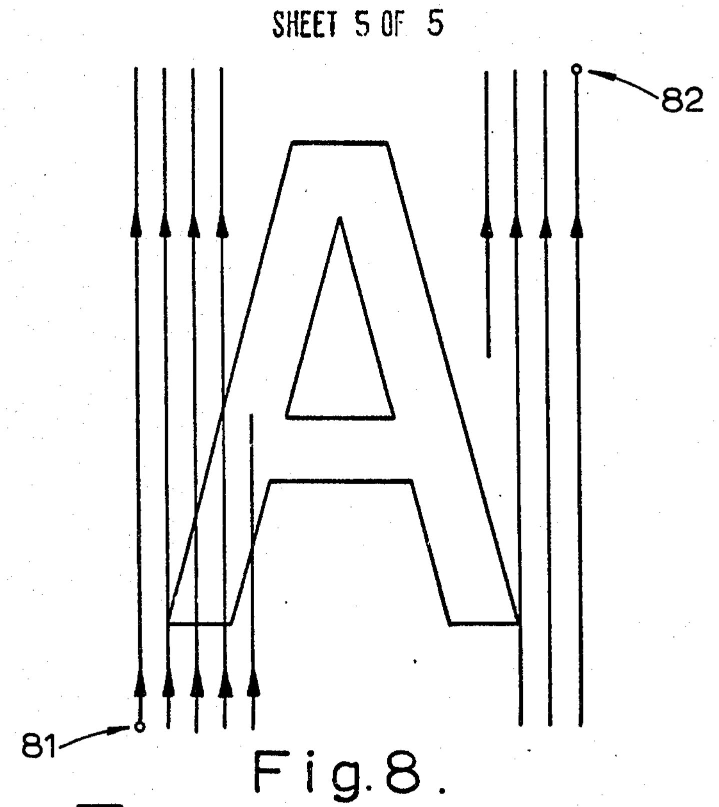
FIG. 8 shows the vertical raster scan of the character on paper.
Figure 9:
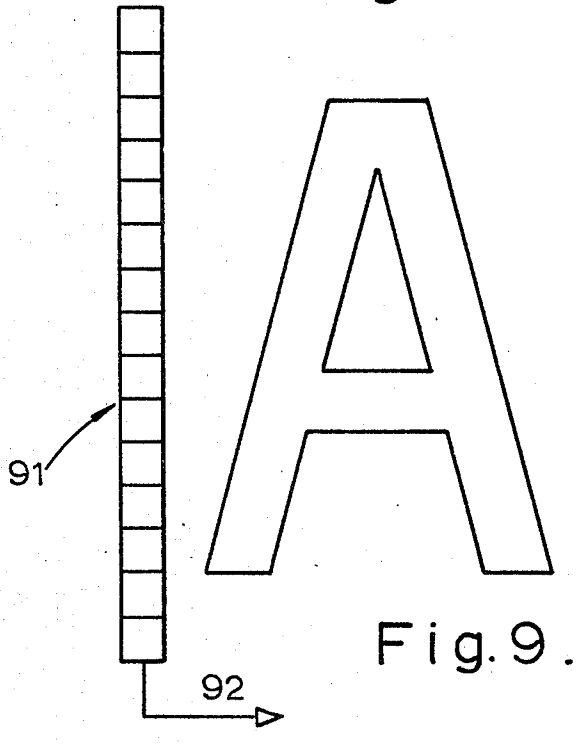
FIG. 9 shows the use of a column of photocells to scan the character on paper.

Referring to FIG. 4, it should be noted that the input 42 to the shift registers 41 (and hence to the recognition system as a whole) may be derived by scanning the character in a number of ways. The organization of the shift register to which the masks are connected makes the vertical raster scan of FIG. 8 a preferred method. This vertical raster scan may be realized by a single moving spot of light or photo-cell aperture, starting at 81, and finishing the scan at 82 after executing a number of vertical scans. It may also be realised by a vertical column of photo-cells, as shown in FIG. 9 at 91, the output FIG. each being sampled in turn from bottom to top of the column and combined into a single output 92. As the character moves horizontally to the left under the photo-cell column, the cycle of sampling the whole column is repeated a sufficient number of times, to provide the number of vertical scans which will resolve the parts of the character adequately. The scanning action, therefore, generates the character matrix. The analogue video output of the single photo-cell or photo-cell column, is now applied to a black/white threshold circuit to convert the video signal to the sequence of the binary signals, 0 and 1, previously referred to, as the result of the act of digitizing the character. If the single photo-cell scan is used, each vertical scan is broken up into a number of time intervals corresponding to the number of elements of area required in the vertical direction. It may be the video output averaged over such an interval which is applied to the black/white threshold circuit, or it may be a sample taken from such a time interval occupying only a fraction of the interval. In practice, the level of the threshold of brightness may be continuously adjusted to afford the best discrimination between the locally observed paper whiteness and print blackness.

In FIG. 4, the main shift register store, to which the mask logic circuits are connected, consists of *n* columns 41 of shift register stages 44 with *m* shift register stages per column, *m* being the number of elements of area in the vertical direction in the character matrix. The input 42 to the store is applied to the top of the first column 41. An output is taken from the bottom of the first column 41, and applied to the top of the second column 41, and so on for all columns 41 of the store. A shift pulse 43 is applied to all stages of the store, as each binary digit enters the top of the first column. The first column of the character matrix would thus be entered into the store as the first column of the character area as scanned. When the second column of the character matrix enters the input to the store, the contents of the first column of the store, are transferred to the second column of the store since the number of shift register stages in the store columns equals the number of elements of area in the vertical direction in the character matrix. Binary digits from element areas in the same horizontal row of the character matrix will thus remain horizontally adjacent to one another in the columns of the shift register. Successive columns of digits from the character matrix will enter the store in like manner while the character is being scanned. A digitized version of the character will thus be built up in the store, which will move down the columns cyclically, moving one column further into the store at each cycle, and so can be said to roll through the store. Eventually, if sufficient shift pulses are applied, the entire character will first be built up in the store, and then will progressively disappear at the final column of the store. Thus, all binary digits of the character matrix will pass through each and every stage of the store. Connections corresponding to the elements of a mask may be made to selected shift register stages, and the rolling mode of motion of the character matrix through the store, ensures that the character matrix is applied to the mask in all possible positions in which the character matrix remains upright.

Figure 5:
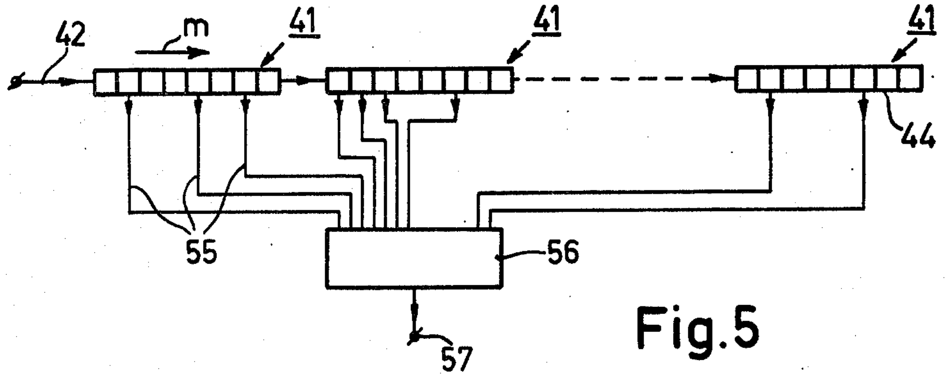
FIG. 5 is the shift register store laid out as a single shift register.
Figure 7:
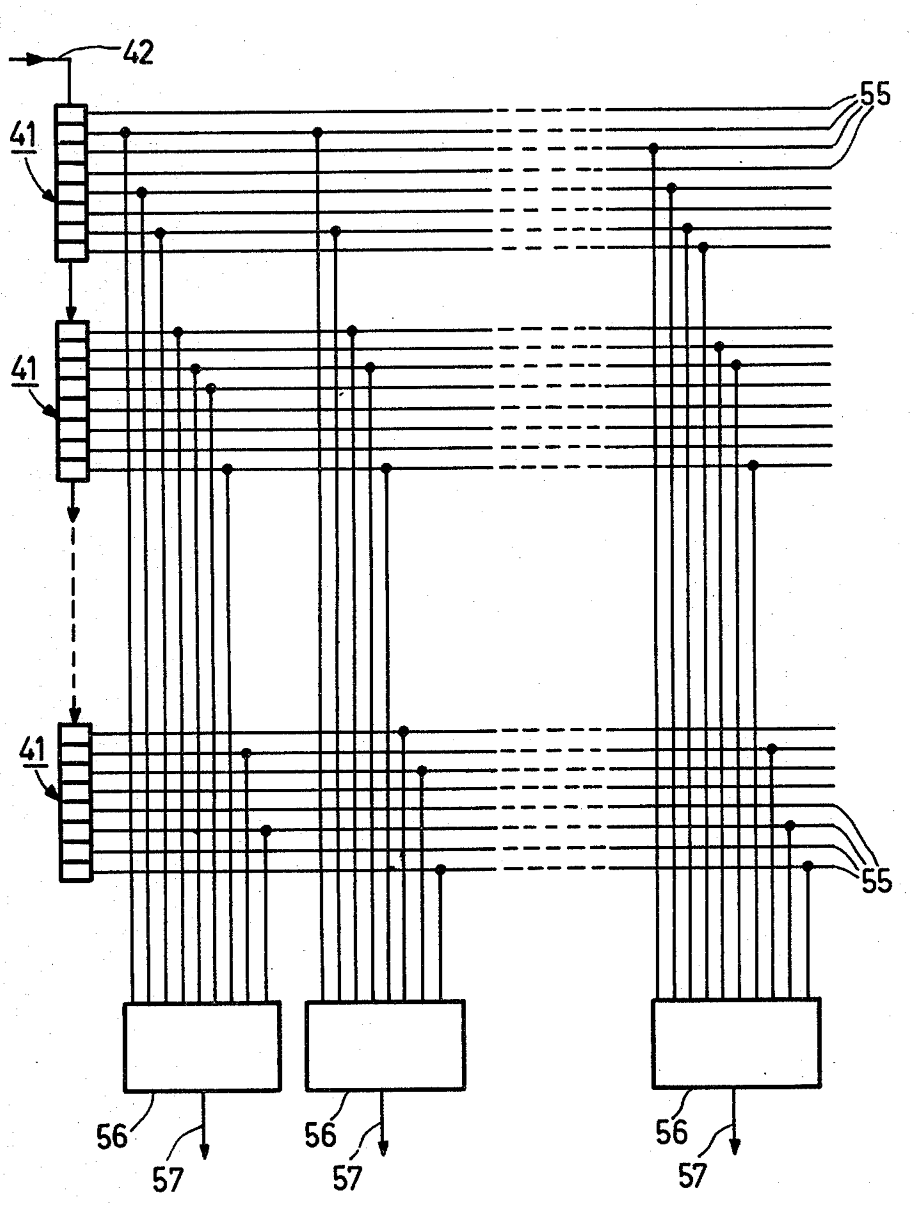
FIG. 7 shows the connection of all the mask logic circuits to the shift register store.

FIG. 5 shows the mask connection points 55 made to the shift registers 41 of FIG. 4, redrawn so as to show their serial connection. The character can now, more readily, be seen as a single binary word passing down a single large shift register. Some positions of this character word, corresponding to the "1"s of the word, may come into simultaneous coincidence with the mask connection points 55, to satisfy the fit criterion applied by the mask logic circuit 56. Only one mask is shown in FIG. 5, whereas in practice, the masks of all characters may be connected to the same shift register, each mask having its own logic circuit 56. FIG. 7 shows the manner in which all the mask logic circuits, one for each of the characters in the font in use, are connected to the shift register store. The shift registers 41 are connected together in series as in FIG. 5, and fed with the digitized character at the input 42. All shift register stages 44 are shown as having a mask connection point 55, drawn now as a bus bar to which a number of mask logic circuits 56 may be connected. Thus, some shift register stages will each feed a number of mask points 55 and, in practice, the logic circuits of circuit 6 will have to be chosen to provide adequately low loading on the shift register to prevent interference with the operation of the shift register.

Figure 6:
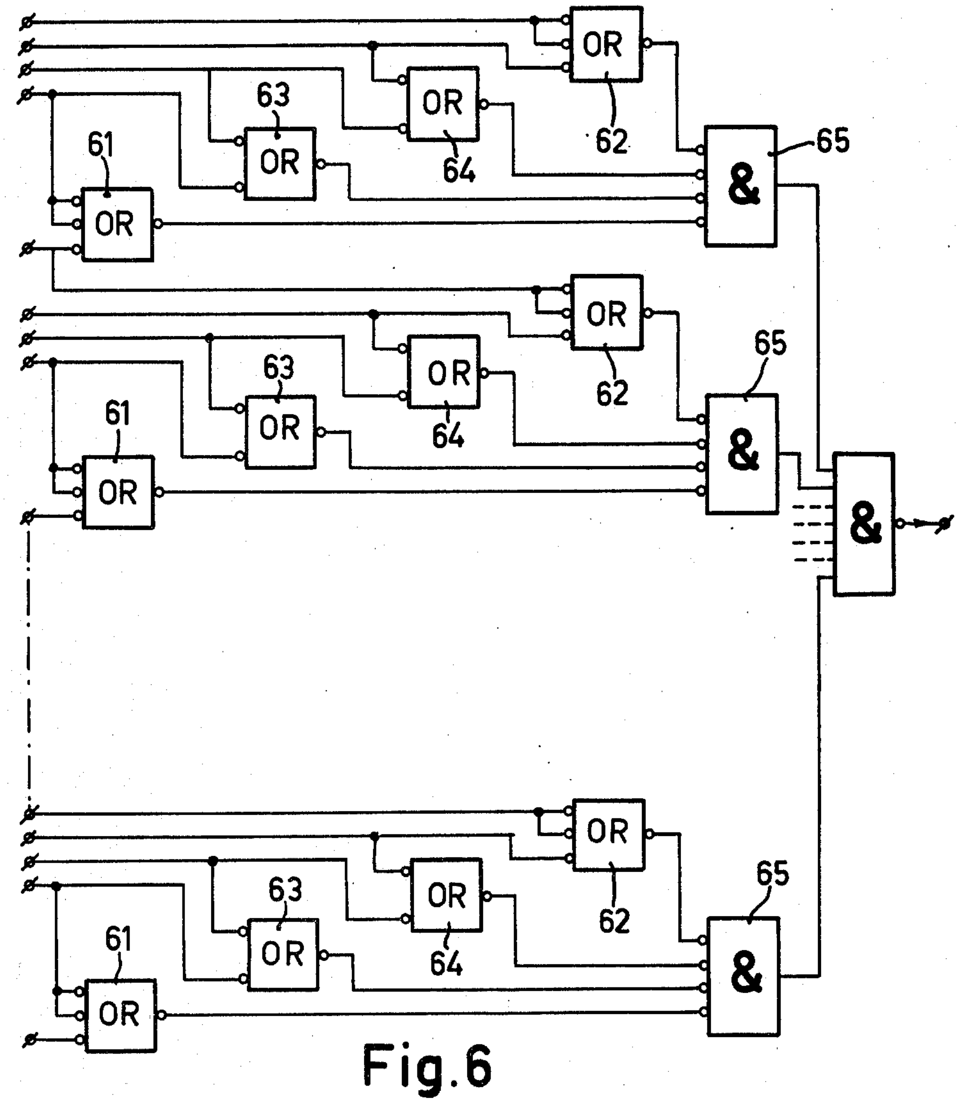
FIG. 6 is a practical mask logic circuit.

FIG. 6 shows aa practical logic circuit using currently available low-power logic units, which meet the low loading requirement mentioned above. The linking of the mask points shown in FIG. 6, is the same as in FIG. 2, that is, overlapping linked pairs of points. However, it is economically more feasible to use inverted logic, and two-stage AND gates, to implement the logic functions suitable to the particular logic units. An integrated circuit can be used which has four OR gates and one AND gate on one 'chip.' Seven such circuits can be used to provide a total of twenty eight OR gates fed from a maximum of twenty nine mask points. Two of the OR gates on each circuit, such as 61 and 62, have three inputs, two of which are connected together to provide two-input OR gates identical in function to gates 63 and 64. The expression "inverted logic" used above, means that a 1 is represented by a low voltage and corresponds to a character black area, and a 0 is represented by a high voltage and corresponds to a character white area. The logic function provided by any gate in FIG. 6, can be determined from the symbols shown on the input and output leads. For example, an OR gate is indicated as such inside the gate rectangle and an AND gate by the symbol '&' similarly placed. If an input lead to a gate has a circle or 0 drawn on it, touching the gate rectangle, this means that a low voltage on this input will give the similarly indicated output when operated upon by the logic function of the gate. For example, the function of OR gate 63 is such that a low voltage on either or both of its inputs will give a low-voltage output. But since inverted logic is being used, this corresponds to logic 1 on either or both inputs giving a logic 1 output. The function of AND gate 65 is such that low-voltage inputs (logical 1s) must be applied to all inputs to produce a high voltage output or logical 0, indicated by the absence of any symbol on the output lead of the gate rectangle. The function of AND gate 66 is such that high-voltage inputs (logical 0s) must be applied to all inputs to produce a low-voltage output, (logical 1) indicating a fit of the character with the mask.

Each output from the mask connection point on the shift register feeds one input on each of two OR Gates, and the two inputs to an OR gate are each fed from separate mask connection points which normally correspond to adjacent mask points, thus achieving the overlapping linked pairing of points illustrated in FIGS. 1*a*, 1*b*, and 2. This linking of points is continued along a character stroke, and the method used to separate strokes when the mask design requires it, is the same as that described in relation to FIG. 2, except that the dummy point is fed with permanent low voltage to correspond with logical 1. The OR gates 61, 62, 63 and 64 feed a single AND gate 65, which produces a high-voltage output (logical 0) when all four of its inputs are low in voltage (at logical 1). The final combination of the outputs of the AND gates 65 into a single output indicating a character fit, is performed by AND gate 66. The output of gate 66 is only low in voltage (at logical 1), indicating a fit, when all of its inputs are high in voltage (at logical 0).

The linking of mask white points into groups has been referred to hereinbefore. One pattern of linking which may be used, is overlapping adjacent linked pairs as has been described for the linking of character mask elements hereinbefore. An apparatus identical to that of FIG. 2, may therefore, be used to implement this pattern for mask white points, provided only that an inversion stage is placed in series with each white mask output before the connection to OR gates 30. Where the white groups are reduced to a single mask white point each, the apparatus of FIG. 2 is no longer appropriate. The output of each single mask white point must be used separately to inhibit the character mask output directly.

What is claimed is:

1. A method of character recognition comprising the steps of:

a. comparing a complete character with each member of a set of masks corresponding to a set of complete characters which may contain such complete character, each mask comprising discrete mask elements set in predetermined relative positions corresponding to selected parts of the associated complete character;

b. linking the mask elements into groups only along selected parts of the associated complete character;

c. detecting a fit of each such linked group with a complete character, by applying a fit criterion in which at least a predetermined fraction of the elements of the mask group along a selected part of the associated complete character fits the complete character; and d. indicating a fit of the complete character with the mask when a selection of the groups of mask elements thus fit such complete character.

2. The method of character recognition of claim 1, wherein the selection of groups for indicating a fit of the character with the mask comprises all of the groups.

3. The method of character recognition of claim 1, wherein the groups are all linked pairs of mask elements.

4. The method of character recognition of claim 1, wherein said fit criterion is dispositive of a character fit depending upon whether adjacent linked mask elements are misfits with respect to said character, regardless of whether single isolated mask elements are misfits.

5. The method of character recognition of claim 1, wherein additional mask elements are provided and selected to fit with background areas, such background mask elements being linked together into groups, and further wherein a fit criterion is applied to each group in which there is any simultaneously occurring fit of the character with the character mask elements, a fit for said character only being declared if at least a predetermined fraction of the elements of each background group are a fit with said background.

6. The method of character recognition of claim 5, wherein the background fit criterion is dispositive of a misfit of the character as a whole, if any one background group is a misfit with the background, despite any concurrently occurring fit of character with the character mask elements.

7. The method of character recognition of claim 1, wherein the character is digitized.

8. A character recognition apparatus comprising:

a. comparing means for comparing a complete character with each member of a set of masks corresponding to a set of complete characters which may contain such complete character, each mask comprising a set of discrete mask elements arranged in predetermined relative positions corresponding to a set of predetermined relative positions along selected parts of the associated complete character;

b. linking means connected to said comparing means for only linking predetermined mask elements of each mask element set into linked groups along selected parts of the associated complete character;

c. detecting means connected to said linking means for detecting a fit of each such linked group with a complete character, by applying a fit criterion in which at least a predetermined fraction of the elements of each linked group of a set along selected parts of the associated complete character fits the complete character; and d. indicating means connected to said detecting means for supplying a signal indicating a fit of the complete character with the mask, when a selection of the linked groups of mask elements thus fit such complete character.

9. The character recognition apparatus as claimed in claim 8, wherein the indicating means indicates a fit when the selection of linked groups comprises all of the linked groups.

10. The character recognition as claimed in claim 8, wherein the linking means links pairs of mask elements into linked groups.

11. The character recognition apparatus as claimed in claim 10, wherein said linking means links a majority of the mask elements which are adjacent mask elements into linked groups each comprising a pair of mask elements.

12. The character apparatus as claimed in claim 5, wherein adjacent pairs of mask elements overlap and share a group, and further wherein the detecting means applies a criterion in which a fit of the character depends upon whether no two adjacent linked mask elements are misfits with respect to the character, even though single isolated mask elements may be misfits.

13. The character recognition apparatus as claimed in claim 8, wherein means are also provided for selecting additional mask elements to fit with background areas, such background mask elements being linked together into groups and means being provided for applying a fit criterion to each group in which any simultaneously occurring fit of the character with the character mask elements will only be declared, if at least a predetermined fraction of the elements of each background group are a fit with the background.

14. The character recognition apparatus as claimed in claim 13, wherein the groups of said background mask elements consist of single background elements, and wherein the background fit criterion means will declare a misfit for the character as a whole if any one background group is a misfit with the background regardless of any concurrently occurring fit of the character with the character mask elements.

15. The character recognition apparatus as claimed in claim 8, wherein means are provided for digitizing the character.

16. The character recognition apparatus as claimed in claim 9, wherein the comparing means comprises a shift register through which character matrix binary values pass in a predetermined sequence, said shift register having connections corresponding to the members of the set of masks, said apparatus further comprising a separate logic circuit for each mask for applying a fit criteria appropriate to that corresponding mask upon receiving an input supplied by said connections.

* * * * *

UNITED STATES PATENT AND TRADEMARK OFFICE

CERTIFICATE OF CORRECTION

PATENT NO. : 3,882,463

DATED : May 6, 1975

INVENTOR(S) : RONALD HOWARD BRITT

It is certified that error appears in the above-identified patent and that said Letters Patent are hereby corrected as shown below:

Column 1, line 50, change "reactangular" to -- rectangular--.

Column 8, line 31, change "aa" to --a--.

Claim 12, line 1, change "5" to --11--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*